(12) United States Patent
Suri et al.

(10) Patent No.: US 7,737,896 B1
(45) Date of Patent: Jun. 15, 2010

(54) SYSTEM AND METHOD FOR OPTIMIZED USE OF A DUAL MODE WIRELESS COMMUNICATION DEVICE

(75) Inventors: Atul Suri, San Diego, CA (US); Anupam Juneja, San Diego, CA (US); Mehul B. Patel, Bangalore (IN); Subramanya Ravikanth Uppala, Bangalore (IN); Digambar Laxman Rasal, Ribandar (IN); Yash Kharia, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 950 days.

(21) Appl. No.: 11/465,079

(22) Filed: Aug. 16, 2006

(51) Int. Cl.
  *H01Q 1/24* (2006.01)
  *H04Q 7/20* (2006.01)
(52) U.S. Cl. ..................... 343/702; 455/434
(58) Field of Classification Search ................ 343/702; 455/434, 423
  See application file for complete search history.

(56) References Cited

U.S. PATENT DOCUMENTS 6,829,481 B2  12/2004  Souissi
7,418,356 B2 *  8/2008  Jin et al. .................. 702/63
2005/0070279 A1 *  3/2005  Ginzburg et al. ............ 455/434
2007/0173287 A1 *  7/2007  Henson et al. .............. 455/557

* cited by examiner

*Primary Examiner*—Shih-Chao Chen

(57) ABSTRACT

Systems and methods for the operation of a dual mode wireless communication device are provided. A wireless communication device includes a scan module, a registration module and a learning module that cooperate to allow the device to identify available radio access technologies, select a radio interface, manage the radio interface, and learn behavioral patterns that optimize operation of the dual mode device. The dual mode device maximizes the overall time it is operational on the better radio access technology while not performing unnecessary scans. This helps in improving performance, preserving battery life and enhancing the overall user experience. In operation, the dual mode device scans for available voice or data networks upon identification of a trigger event, for example, a manual instruction, a drop in signal strength, a loss of signal, a time of usage on a particular network, a battery condition, an application preference, a state of the wireless communication device, or a geographic location. Various trigger events may be stored in a data storage area on the device and new trigger events such as geographic locations where manual scans are frequently requested by the user or geographic locations where signal strength is low or the network signal is typically lost can be stored for future reference by the device in order to improve performance.

21 Claims, 3 Drawing Sheets

SYSTEM AND METHOD FOR OPTIMIZED USE OF A DUAL MODE WIRELESS COMMUNICATION DEVICE

TECHNICAL FIELD

The present invention generally relates to dual mode wireless communication devices and more particularly relates to the overall management of the radio access technologies available to a dual mode wireless communication device.

BACKGROUND

Conventional dual mode mobile devices with the ability to access data networks and voice networks are required to select and manage the different radio interface channels that provide access to the data and voice networks. These conventional devices are often operational on the worse of the two radio interface channels, causing the user experience to degrade and suffer. Furthermore, these conventional devices typically perform unnecessary scans looking for available or preferred networks and in doing so shorten the battery life of the mobile device.

One limited solution is disclosed in U.S. Pat. No. 6,829,481 ("Souissi") that allows a mobile device in a region of overlapping coverage between competing network to switch from a non-preferred network to a preferred network according to a roaming table. Souissi describes eliminating continuous background scanning for available networks by storing geographic position information for available networks in the roaming table. Souissi teaches that this information in the roaming table provides a GPS enabled device with foreknowledge of available networks and reduces the need for continuous background scanning. Unfortunately, the solution described in Souissi significantly suffers from incorrect or stale position information, and may actually result in the device performing many unnecessary scans to determine the real time status of available networks.

These significant drawbacks of the conventional dual mode mobile devices result in less than desirable performance by the mobile device and a diminished overall user experience. What is needed is a system and method that addresses these problems with the conventional dual mode mobile devices.

SUMMARY

Described herein are systems and methods for operating a dual mode wireless communication device. A wireless communication device includes a scan module, a registration module, and a learning module that, in cooperation, allow the device to identify available radio access technologies, select a radio interface, manage the radio interface, and learn behavioral patterns that allow the device to optimize the identification, selection, and management of the radio interfaces in the dual mode wireless communication device.

In operation, a dual mode device determines when to scan for available voice or data networks. A trigger event may prompt the device to scan. A trigger event may be, for example, a manual instruction, a drop in signal strength, a loss of signal, a total time of usage on a particular network, a battery condition, an application preference, a state of the wireless communication device, or a geographic location. The various trigger events may be stored in a data storage area on the device. A scan may also be undertaken according to a user preference or a network preference, depending on the circumstances. Additionally, new trigger events such as geographic locations where manual scans are frequently requested by the user or geographic locations where signal strength is low or the network signal is typically lost can be stored for future reference by the device in order to improve performance.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts.

DETAILED DESCRIPTION

Certain embodiments as disclosed herein provide for systems and methods for the operation of a dual mode wireless communication device. For example, one method provides for a dual mode wireless communication device to identify available radio access technologies, select a radio interface, manage the radio interface, and learn behavioral patterns that optimize operation of the dual mode device. The dual mode device maximizes the overall time it is operational on the better radio access technology while avoiding unnecessary scans, thereby improving performance, preserving battery life and enhancing the overall user experience.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
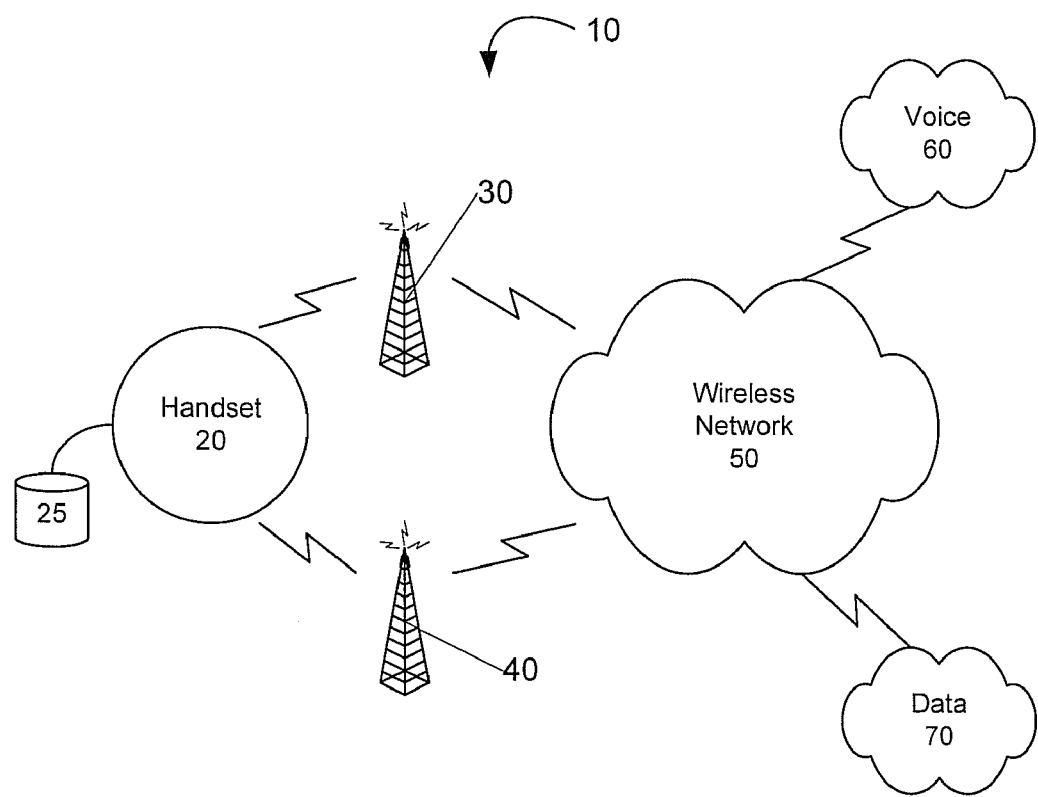
FIG. 1 is a block diagram illustrating an example system for dual mode device operation according to an embodiment of the present invention.

FIG. 1 is a block diagram illustrating an example system 10 for dual mode device operation over a wireless network 50 according to an embodiment of the present invention. In the illustrated embodiment, the system 10 comprises a wireless communication device 20 configured with a data storage area 25, two base stations 30 and 40, a wireless network 50, a voice network 60, and a data network 70.

The wireless communication device 20 can be any of a variety of wireless communication devices, including a cell phone, personal digital assistant ("PDA"), personal computer ("PC"), laptop computer, PC card, special purpose equipment, or any combination of these and other devices capable of establishing a communication link with a voice network 60 or a data network 70 via the wireless network 50. An example general purpose wireless device is later described with respect to FIG. 7. The wireless communication device 20 may be referred to herein as a handset, wireless device, mobile device, device, wireless unit, or mobile unit.

The data storage area 25 that is associated with the handset 20 can be any sort of internal or external memory device and may include both persistent and volatile memories. The function of the data storage area 25 is to maintain data for long term storage and also to provide efficient and fast access to instructions for applications that being executed by the respective device or module.

The base stations 30 and 40 can be any of a variety of types of access points that allow the handset 20 to communicate over wireless network 50. In one embodiment, base station 30 is configured to carry voice traffic and operates at a frequency that is different from base station 40, which is configured to carry data traffic. Alternatively, each base station 30 and 40 may be configured to simultaneously carry both voice and data traffic. Additionally, each base station 30 and 40 may be operated by a different wireless network provider. The function of the base stations is to send and receive the wireless network traffic (both voice and data) to and from the handset 20 and convey that network traffic to and from the voice network 60 and the data network 70. In one embodiment, wireless network 50 may physically or logically be situated between the base stations 30 and 40 and the voice network 60 and the data network 70.

Wireless network 50 may comprise a plurality of networks including private, public, circuit switched, packet switched, personal area networks ("PAN"), local area networks ("LAN"), wide area networks ("WAN"), metropolitan area networks ("MAN"), or any combination of the these. Other network types may also be included as needed to facilitate communication between the handset 20 and the voice network 60 and/or the data network 70.

Furthermore, in alternative implementations there may be more than just a single wireless network 50 and additional other networks, as will also be understood by those having skill in the art. For the sake of simplicity of this description, however, the embodiment described will include a single wireless network 50 that provides access for the handset 20 to communicate with the voice network 60 and the data network 70.

The voice network 60 may be any of a variety of public switched networks, private radio networks, packet data networks or the like. Voice network traffic may be packetized such as in a voice over internet protocol ("VOIP") application or it may be carried over a circuit connection. Combinations of circuit and VOIP may also be employed between the handset 20 and the voice network 60. The function of the voice network 60 is to support a voice connection between a user of the handset 20 and one or more parties on remote devices (not shown).

The data network 70 may be any of a variety of networks such as a private, public, circuit switched, packet switched, PAN, LAN, WAN, MAN, or any combination of these such as the ubiquitous Internet. The function of the data network 70 is to support data transmissions between the handset 20 and one or more remote devices (not shown).

Figure 2:
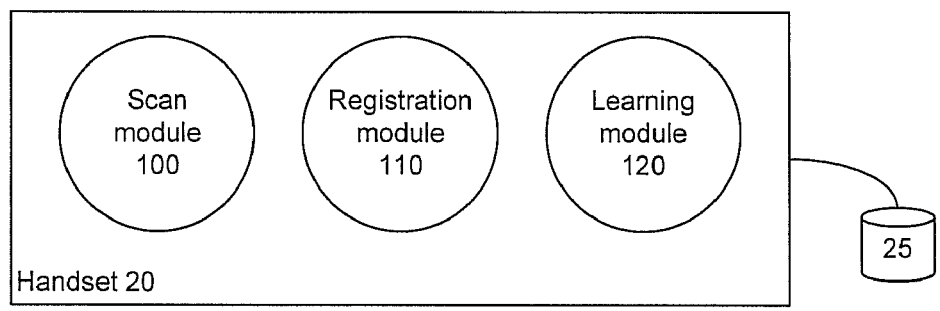
FIG. 2 is a block diagram illustrating an example wireless communication device according to an embodiment of the present invention.

FIG. 2 is a block diagram illustrating an example wireless communication device 20 according to an embodiment of the present invention. In the illustrated embodiment, the handset 20 comprises a scan module 100, a registration module 110, and a learning module 120. The handset 20 is also configured with an internal or external data storage area 25 as previously described with respect to FIG. 1.

The scan module 100 is configured to determine when to make a scan for available networks and also to perform the scan for available voice or data networks. In one embodiment, the scan module 100 is configured to support multiple receive chains for a variety of different wireless interfaces. These multiple receive chains could be implemented in a single chip or multiple chip solutions with varying levels of combination with software. For example, to detect a code division multiple access ("CDMA") network, the handset 20 may use a CDMA receive chain to identify a CDMA pilot channel. Alternatively, to detect a wireless LAN data network that conforms to the IEEE 802.11(b) standard (referred to herein as "WiFi" or "WiFi network"), the handset 20 may use a WiFi receive chain to identify a WiFi beacon.

In one embodiment, the scan module 100 is configured to monitor the status of the handset 20 and the status of its current connection to a network. The scan module 100 is further configured to compare the status of the handset and/or network connection to a set of parameters in order to determine when to scan for available networks. When conducting a scan, the scan module 100 may scan according to a preferred roaming list ("PRL") or its equivalent in order to be more efficient and minimize the use of the finite resources of the handset 20.

The registration module 110 is configured to register the handset 20 on a newly detected available network. In one embodiment, the registration module 110 determines if the available network is acceptable for registration, for example, by comparing information about the available network to certain parameters or preferences that are stored on the handset 20. For example, the registration module 110 may compare the signal strength of an available network to a minimum threshold parameter to determine if the available network is acceptable. Alternatively, the registration module 110 may compare the type of available network (e.g., voice or data) to a preferred network type to determine if the available network is acceptable.

The learning module 120 is configured to track and store information about the registration of the handset 20 on various networks. In one embodiment, the learning module stores information about scans initiated by a request from the user, information about scans initiated by network signal loss, scans initiated by the location of the handset 20, and scans initiated for any other reason. This information is stored and maintained as a set of parameters that allow the handset 20 to predict when a scan may be initiated by the user or when a scan may be required due to a loss of the network signal so that the handset 20 may automatically initiate the scan to provide a seamless transition to an alternative available network if necessary. Advantageously, this may eliminate or significantly reduce the amount of periodic scanning required by the handset and thereby reduces strain on the battery life and other finite resources of the handset 20.

Figure 3:
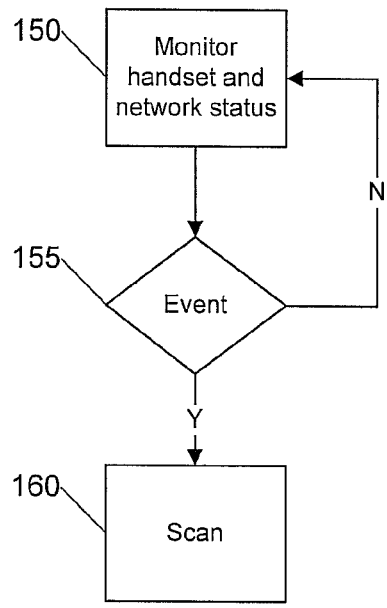
FIG. 3 is a flow diagram illustrating an example method for determining when to scan for available networks according to an embodiment of the present invention.

FIG. 3 is a flow diagram illustrating an example method for determining when to scan for available networks according to an embodiment of the present invention. In one embodiment, this method may be carried out by a device such as the handset previously described with respect to FIG. 1. Initially, in step 150 the status of the handset and its connection to the network is monitored. For example, the handset may monitor the level of its battery power, the strength of the signal between the handset and the network, the amount of time the handset has been on a particular network (e.g., voice network and data network), the time of usage as compared against a user's calling plan schedule (e.g., peak minutes usage associated with higher cost, off-peak minutes usage associated with reduced cost), and the geographic location of the handset, just to name a few types of parameters that may be monitored by the handset.

While monitoring the status of the handset, if the handset detects an event, as determined in step 155, then the handset proceeds to conduct a scan for available networks, as illustrated in step 160. In one embodiment, an event that triggers the handset to initiate a scan for available networks may include an instruction received from a user of the handset (e.g., a manual scan), a drop in the signal strength below a certain threshold, a loss of the signal from the network (e.g., system failure), the time of usage reaching a certain threshold (e.g., establishing cost metric thresholds by comparing time of usage against one or more calling plan schedules), a battery condition (e.g., a low battery), the launching of an application with a preference for a particular network, the state of the handset, or the geographic location of the handset, just to name a few.

In one embodiment, as the handset monitors the various operational or other parameters to determine the presence of a trigger event, certain predetermined thresholds and variable settings stored in memory can be compared to real time metrics that pertain to the handset. When a trigger event does occur, as determined by the handset itself, then a scan can be carried out to identify available networks that the handset may switch over to for continued and seamless network connectivity.

Figure 4:
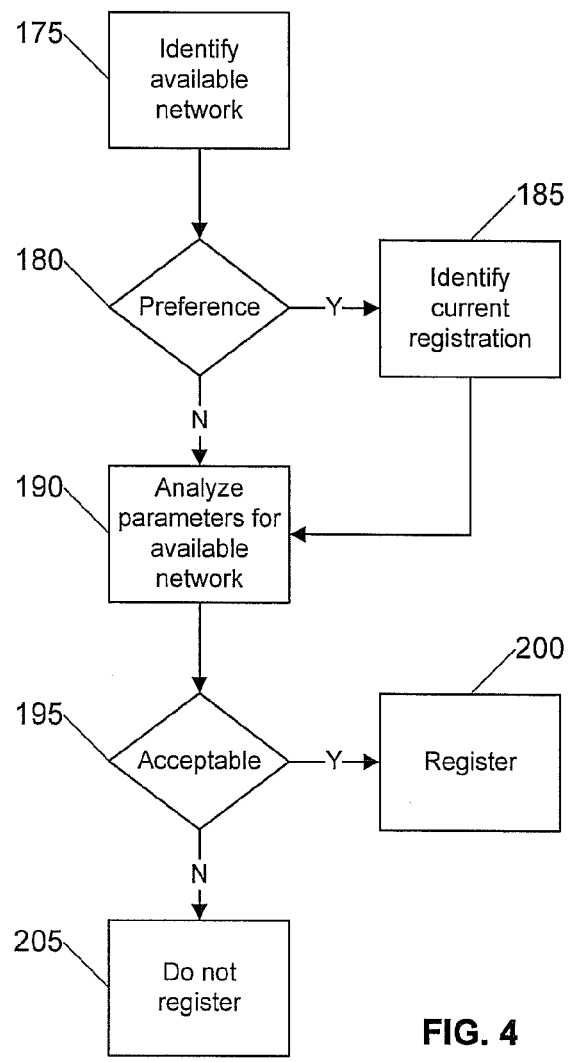
FIG. 4 is a flow diagram illustrating an example process for registering a dual mode wireless communication device on an available network according to an embodiment of the present invention.

FIG. 4 is a flow diagram illustrating an example process for registering a dual mode wireless communication device on an available network according to an embodiment of the present invention. In one embodiment, this process can be implemented by a device such as the handset previously described with respect to FIG. 1. The process begins after a scan has taken place. In step 175, the handset identifies an available network, as determined by the scan. Next, the handset determines, in step 180, whether there is a user or network preference for what network the handset should be registered with. If there is a preference, the handset then identifies the current registration so that this factor can be compared to the preferred network parameter.

In step 190, the handset analyzes various parameters related to the identified available network and the current status of the handset. For example, the available network type can be compared to the preferred network type previously identified in step 185 or the battery condition may be compared to a threshold parameter to determine if the handset should only register on the available network that is less battery intensive. In one embodiment, the time of usage may be compared against one or more customer call plan schedule of fees to determine a preferred network (e.g., the network that would incur reduced or less fees). Additional analysis of the various parameters that are monitored and stored by the handset, as will be understood by one having skill in the art having the benefit of the present disclosure.

After the analysis is complete, the handset determines in step 195 whether the identified available network is acceptable for a connection by the handset. If in the aggregate the available network is acceptable, then in step 200 the handset registers on the available network. In one embodiment, the signal strength is analyzed to ensure that it is above a certain threshold for a particular duration of time to avoid registration back and forth between different radio access technologies. Next, as determined by the handset in step 195, if the analysis shows that the available network is not acceptable, then in step 205 the handset does not register with the available network.

Figure 5:
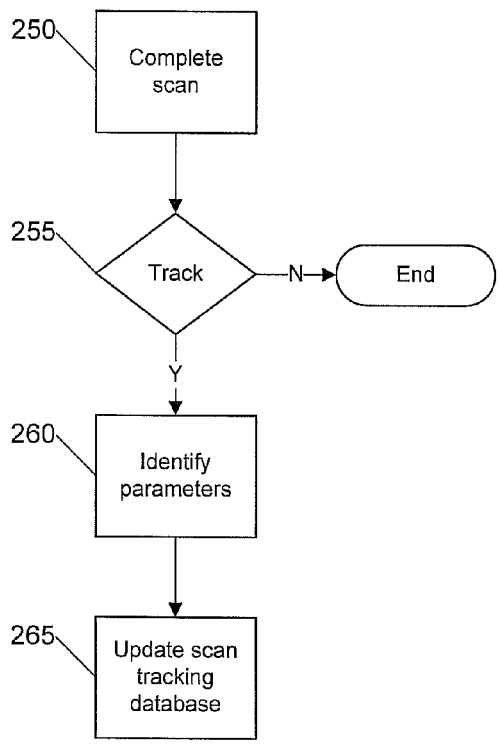
FIG. 5 is a flow diagram illustrating an example process for enhancing a database of scanning events according to an embodiment of the present invention.

FIG. 5 is a flow diagram illustrating an example process for enhancing a database of scanning events according to an embodiment of the present invention. In one embodiment, this process can be implemented by a device such as the handset previously described with respect to FIG. 1. Initially, the scan for available networks completes in step 250. The scan may be initiated, for example, by an instruction from the user of the handset. Next, in step 255 the handset determines if the event that led to the scan is a tracking event. In one embodiment, a power up of the handset is an event that would initiate a scan, but that event is not a tracking event. Advantageously, the handset may have an event profile or a list of certain types of events that are tracking events so that it may determine whether a particular event is a tracking event. Examples of tracking events include: a manual scan initiated by the user; the launching of a particular application; the proximity of the handset to a particular geographic location; the battery condition of the handset; the amount of time (in the billing cycle, quarterly, YTD, etc.) that the handset has been connected to a particular network; time of usage as compared against one or more customer calling plan schedule of fees; the signal strength for the connection between the handset and the network; and the current network registration being different from a preferred network registration, just to name a few. If the handset determines that the event causing the scan is not a tracking event, then the process ends.

If, as determined by the handset in step 255, the event causing the scan is a tracking event, then the handset identifies relevant parameters for the event and the network identified by the scan. These parameters may include the geographic location of the handset, the type of network the handset was previously registered with (the old network), the type of available network identified by the scan (the new network), the signal strength of the old network, the signal strength of the new network, the applications that are running on the handset, the usage time for the old network, and the priority of the old network and the new network on a preferred roaming list or system identification list or some other equivalent prioritization of networks to register with (collectively referred to herein as a "preferred roaming list"), just to name a few.

After identifying the parameters (or as the parameters are identified over time) in step 265 the handset next updates a tracking database or some other collection of information that is stored in a data storage area on the handset for future analysis. Advantageously, these parameters may be used to learn the behavioral aspects of a user or of the various network connections so that the handset may monitor its status and the status of its connections to predict when the user may initiate a manual scan or when the network connection status may require a scan. In this way, the handset may initiate a scan for available networks in advance and in doing so improve performance, preserve battery life, and enhance the overall user experience.

Figure 6:
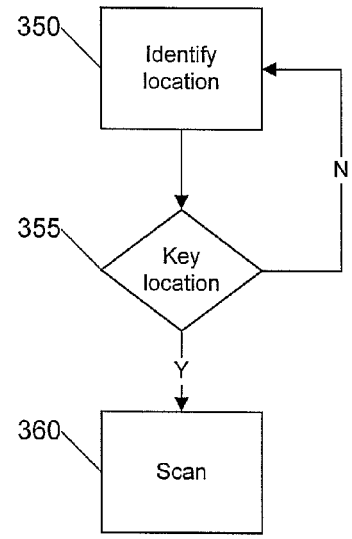
FIG. 6 is a flow diagram illustrating an example process for location based scanning according to an embodiment of the present invention.

FIG. 6 is a flow diagram illustrating an example process for location based scanning according to an embodiment of the present invention. In one embodiment, this process can be implemented by a device such as the handset previously described with respect to FIG. 1. Initially, in step 350, the handset identifies its current location. Next, in step 355, the handset compares its current location to the parameters stored in the data storage area on the handset to determine if the current location is a key location. If the present location is determined not to be a key location, then handset continues to monitor its location by identifying its location and determining if its location is a key location. If the handset determines that it is currently at a key location (e.g., where the user typically instructs the handset to make a manual scan), then the handset performs a scan, as illustrated in step 360.

Figure 7:
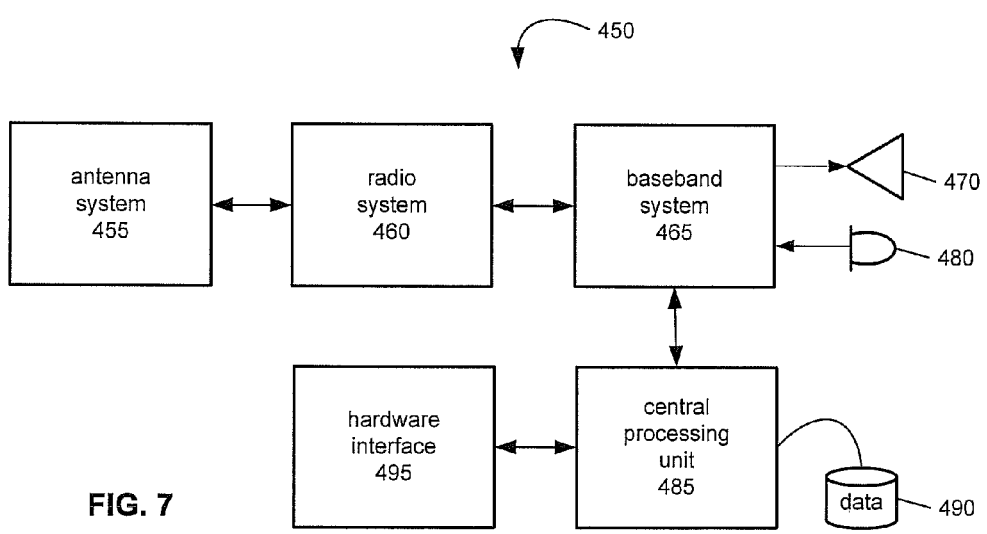
FIG. 7 is a block diagram illustrating an exemplary wireless communication device that may be used in connection with the various embodiments described herein.

FIG. 7 is a block diagram illustrating an exemplary wireless communication device 450 that may be used in connection with the various embodiments described herein. For example, the wireless communication device 450 may be used in conjunction with the handset described above with respect to FIGS. 1 and 2. However, other wireless communication devices and/or architectures may also be used, as will be clear to those skilled in the art.

In the illustrated embodiment, wireless communication device 450 comprises an antenna system 455, a radio system 460, a baseband system 465, a speaker 464, a microphone 470, a central processing unit ("CPU") 485, a data storage area 490, and a hardware interface 495. In the wireless communication device 450, radio frequency ("RF") signals are transmitted and received over the air by the antenna system 455 under the management of the radio system 460.

In one embodiment, the antenna system 455 may comprise one or more antennae and one or more multiplexors (not shown) that perform a switching function to provide the antenna system 455 with transmit and receive signal paths. In the receive path, received RF signals can be coupled from a multiplexor to a low noise amplifier (not shown) that amplifies the received RF signal and sends the amplified signal to the radio system 460.

In alternative embodiments, the radio system 460 may comprise one or more radios that are configured to communication over various frequencies. In one embodiment, the radio system 460 may combine a demodulator (not shown) and modulator (not shown) in one integrated circuit ("IC"). The demodulator and modulator can also be separate components. In the incoming path, the demodulator strips away the RF carrier signal leaving a baseband receive audio signal, which is sent from the radio system 460 to the baseband system 465.

If the received signal contains audio information, then baseband system 465 decodes the signal and converts it to an analog signal. Then the signal is amplified and sent to the speaker 470. The baseband system 465 also receives analog audio signals from the microphone 480. These analog audio signals are converted to digital signals and encoded by the baseband system 465. The baseband system 465 also codes the digital signals for transmission and generates a baseband transmit audio signal that is routed to the modulator portion of the radio system 460. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 455 where the signal is switched to the antenna port for transmission.

The baseband system 465 is also communicatively coupled with the central processing unit 485. The central processing unit 485 has access to a data storage area 490. The central processing unit 485 is preferably configured to execute instructions (i.e., computer programs or software) that can be stored in the data storage area 490. Computer programs can also be received from the baseband processor 465 and stored in the data storage area 490 or executed upon receipt. Such computer programs, when executed, enable the wireless communication device 450 to perform the various functions of the present invention as previously described. For example, data storage area 490 may include the scan, registration, and learning modules (not shown) that were previously described with respect to FIG. 2.

In this description, the term "computer readable medium" is used to refer to any media used to provide executable instructions (e.g., software and computer programs) to the wireless communication device 450 for execution by the central processing unit 485. Examples of these media include the data storage area 490, microphone 470 (via the baseband system 465), antenna system 455 (also via the baseband system 465), and hardware interface 495. These computer readable mediums are means for providing executable code, programming instructions, and software to the wireless communication device 450. The executable code, programming instructions, and software, when executed by the central processing unit 485, preferably cause the central processing unit 485 to perform the inventive features and functions previously described herein.

The central processing unit 485 is also preferably configured to receive notifications from the hardware interface 495 when new devices are detected by the hardware interface. Hardware interface 495 can be a combination electromechanical detector with controlling software that communicates with the CPU 485 and interacts with new devices. The hardware interface 495 may be a firewire (IEEE 1394) port, a USB port, a Bluetooth or infrared wireless unit, or any of a variety of wired or wireless access mechanisms. Examples of hardware that may be linked with the device 450 include data storage devices, computing devices, headphones, microphones, and the like.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. In addition, the grouping of functions within a module, block, circuit or step is for ease of description. Specific functions or steps can be moved from one module, block or circuit to another without departing from the invention.

Various embodiments may also be implemented primarily in hardware using, for example, components such as application specific integrated circuits ("ASICs", or field programmable gate arrays ("FPGAs"). Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. For example, implementation of a hardware state machine capable of performing the functions described herein will also be apparent to those skilled in the relevant art. Various embodiments may also be implemented using a combination of both hardware and software.

Moreover, the various illustrative logical blocks, modules, and methods described in connection with the embodiments disclosed herein can be implemented or performed with a general purpose processor, a digital signal processor, ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A computer implemented method for operating a dual mode wireless communication device on a voice network and a data network, comprising:
   monitoring the status of a wireless communication device and a connection between the wireless communication device and a first network;
   identifying a trigger event in said status or said connection;
   scanning for an available wireless communication network;
   identifying an available wireless communication network, wherein the available wireless communication network has a plurality of associated parameters;
   analyzing the plurality of associated parameters and information stored in a data storage area to determine whether registration on the available wireless communication network is acceptable; and
   registering the wireless communication device on the available wireless communication network if the analysis determines that such registration is acceptable.

2. The method of claim 1, wherein the trigger event comprises the battery condition of the wireless communication device.

3. The method of claim 1, wherein the trigger event comprises the geographic location of the wireless communication device.

4. The method of claim 1, wherein the trigger event comprises a signal strength between the wireless communication device and the first network.

5. The method of claim 1, wherein the trigger event comprises time of use of the connection between the wireless communication device and the first network, the time of use compared against a calling plan schedule.

6. The method of claim 1, wherein the trigger event comprises network availability of the first network.

7. The method of claim 1, wherein the information stored in the data storage area comprises a preferred roaming list.

8. The method of claim 1, wherein the information stored in the data storage area comprises a user network preference.

9. The method of claim 1, wherein the information stored in the data storage area comprises a carrier network preference.

10. The method of claim 1, wherein the information stored in the data storage area comprises an application network preference.

11. The method of claim 1, further comprising:
    identifying the trigger event as a tracking event;
    identifying one or more parameters pertaining to the trigger event; and
    storing said parameters in a data storage area.

12. The method of claim 11, wherein one of said parameters is a geographic location.

13. The method of claim 11, wherein one of said parameters is identification information for the available network.

14. A dual mode wireless communication device configured to be communicatively coupled to a voice network or a data network via a wireless communication network, the wireless communication device comprising:
    an antenna system configured to send and receive signals over a wireless physical medium;
    a radio system configured to manage the antenna system for use with two or more radio access technologies, wherein a first radio access technology provides a connection to a voice network and a second radio access technology provides a connection to a data network;
    a central processing unit configured to execute instructions stored in a data storage area and access data stored in a data storage area;
    a scan module executable by the central processing unit, the scan module configured to monitor the wireless communication device and a connection between the wireless communication and a network and initiate a scan for available networks in response to an identified a trigger event;
    a registration module executable by the central processing unit, the registration module configured to analyze information in the data storage area and information about an available network identified by the scan module to determine whether registration on the available network is acceptable; and
    a learning module executable by the central processing unit, the learning module configured to store information in the data storage area, said information related to one or more trigger events and registration of the wireless communication device on an available network.

15. The system of claim 14, wherein the scan module is further configured to initiate a scan for available networks in response to low battery power on the wireless communication device.

16. The system of claim 14, wherein the scan module is further configured to initiate a scan for available networks in response to an instruction from a user.

17. The system of claim 14, wherein the scan module is further configured to initiate a scan for available networks in response to a low signal strength for the connection between the wireless communication device and the network.

18. The system of claim 17, wherein the threshold for the low signal strength is predetermined and stored in the data storage area.

19. The system of claim 14, wherein the scan module is further configured to initiate a scan for available networks in response to an identified geographic location for the wireless communication device.

20. The system of claim 14, wherein the scan module is further configured to initiate a scan for available networks in response to a time of use of a particular network connection compared against a calling plan schedule.

21. The system of claim 14, wherein the scan module is further configured to scan for available networks while the wireless communication device is registered on a network.

* * * * *